United States Patent

Ohashi et al.

[11] Patent Number: 5,975,191
[45] Date of Patent: Nov. 2, 1999

[54] VEHICLE AIR CONDITIONER

[75] Inventors: Toshio Ohashi; Kaoru Kamiyama; Tadayoshi Tajima, all of Tochigi, Japan

[73] Assignee: Calsonic Corporation, Tokyo, Japan

[21] Appl. No.: 08/958,401

[22] Filed: Oct. 29, 1997

[51] Int. Cl.[6] .................................................. B60H 1/32
[52] U.S. Cl. .............................. 165/43; 62/244; 62/325
[58] Field of Search ................................. 62/244, 196.4, 62/117, 159, 90, 173, 325; 165/42, 43

[56] References Cited

U.S. PATENT DOCUMENTS

| | | | |
|---|---|---|---|
| 3,841,395 | 10/1974 | Steinmann | 165/35 |
| 5,341,652 | 8/1994 | Tajiri et al. | 62/244 |
| 5,386,704 | 2/1995 | Benedict | 62/325 |
| 5,477,700 | 12/1995 | Iio | 62/231 |
| 5,499,511 | 3/1996 | Hara et al. | 62/180 |
| 5,598,887 | 2/1997 | Ikeda et al. | 62/196.4 |

FOREIGN PATENT DOCUMENTS

| | | |
|---|---|---|
| 2-500677 | 3/1990 | Japan . |
| 5-201243 | 8/1993 | Japan . |
| 7-101227 | 4/1995 | Japan . |
| 7-132728 | 5/1995 | Japan . |
| 8-295117 | 11/1996 | Japan . |
| 9-109669 | 4/1997 | Japan . |

*Primary Examiner*—William E. Tapoicai
*Attorney, Agent, or Firm*—Foley & Lardner

[57] ABSTRACT

A dual type vehicle air conditioning system has a rear air conditioning system for rear seats and a front air conditioning system for front seats. The rear conditioning system has a rear conditioner unit defining a main air passage for directing inside air through an evaporator and a condenser in sequence. The rear conditioner unit further has a bypass air passage for introducing the inside air to the condenser, bypassing the evaporator, and an exhaust air passage for directing the inside air from the evaporator to the outside of the vehicle.

17 Claims, 9 Drawing Sheets

VEHICLE AIR CONDITIONER

BACKGROUND OF THE INVENTION

The present invention relates to a dual type vehicle air conditioner comprising separated air conditioning systems.

Recently, dual type vehicle air conditioning systems are mounted on part of luxury cars, wagons and minivans (or one-box cars).

A vehicle air conditioning system of this type includes a first air conditioning system for air-conditioning inside air and directing conditioned air toward rear seats, and a second air conditioning system for air-conditioning inside and outside air selectively and supplying conditioned air to front seats. Each of the first and second air conditioning systems includes a heater core using hot water (engine cooling water) supplied from an engine as a heat source for warming air.

The heater core, however, tends to become insufficient in heating ability when the outside temperature is low in winter. Specifically, a lean-burn engine generates less heat and the heat quantity of engine cooling water tends to be too small.

SUMMARY OF THE INVENTION

It is an object of the present invention to provide a vehicle air conditioning system enabling a quick heating operation even when the outside temperature is low.

According to the present invention, a vehicle air conditioning system comprises at least a first air conditioning system for air-conditioning inside air and supplying conditioned air to one region of a compartment of the vehicle. Preferably, the vehicle air conditioning system further comprises a second air conditioning system for air-conditioning inside and outside air selectively and supplying conditioned air to another region of the vehicle compartment. In this vehicle air conditioning system, the first air conditioning system is constituted by a refrigerant line and a first air conditioner unit. The refrigerant line comprises a circulation line for introducing refrigerant discharged from a compressor through a first condenser into a first evaporator connected with a second condenser in series, and a bypass line bypassing the first condenser. The first air conditioning unit comprises a first air passage in which the first evaporator and the second condenser are arranged in sequence from the upstream side, a bypass means for introducing the inside air into an air passage section between the first evaporator and the second condenser, and an exhaust means for exhausting the inside air from the first evaporator into the outside of the vehicle.

The first air conditioning system can use the refrigerant discharged from the compressor as a heat source for warming air, and recover heat from the air to be exhausted for ventilation by heat exchange in the first evaporator.

According to one embodiment of the present invention, the second air conditioning system comprises a circulation line for introducing the refrigerant discharged from the compressor through the first condenser into a third condenser and a second evaporator, and a second air conditioning unit comprising a second air passage in which the second evaporator and the third condenser are arranged in sequence from the upstream side.

The second air conditioning system can also use the refrigerant discharged from the compressor as a heat source for warming air, so that a hot water line is not necessary.

According to another embodiment, the second air conditioning system comprises a circulation line for introducing the refrigerant discharged from the compressor into a second evaporator through the first condenser, a hot water line for introducing engine cooling water into a heater core, and a second air conditioning unit comprising a second air passage in which the second evaporator and the heater core are arranged in sequence from the upstream side.

The second air conditioning system can use the engine cooling water as a heat source for warming operation of air conditioning.

According to still another embodiment, the second air conditioning unit comprises both of the third condenser and the heater core. In the second air passage, the third condenser is positioned between the second evaporator and the heater core. The third condenser is connected with the second evaporator so that the circulating refrigerant flows from the third condenser to the second evaporator.

In this case, the second air conditioning unit can use both the engine cooling water and the refrigerant as a heat source for warming air.

DETAILED DESCRIPTION OF THE INVENTION

Figure 1:
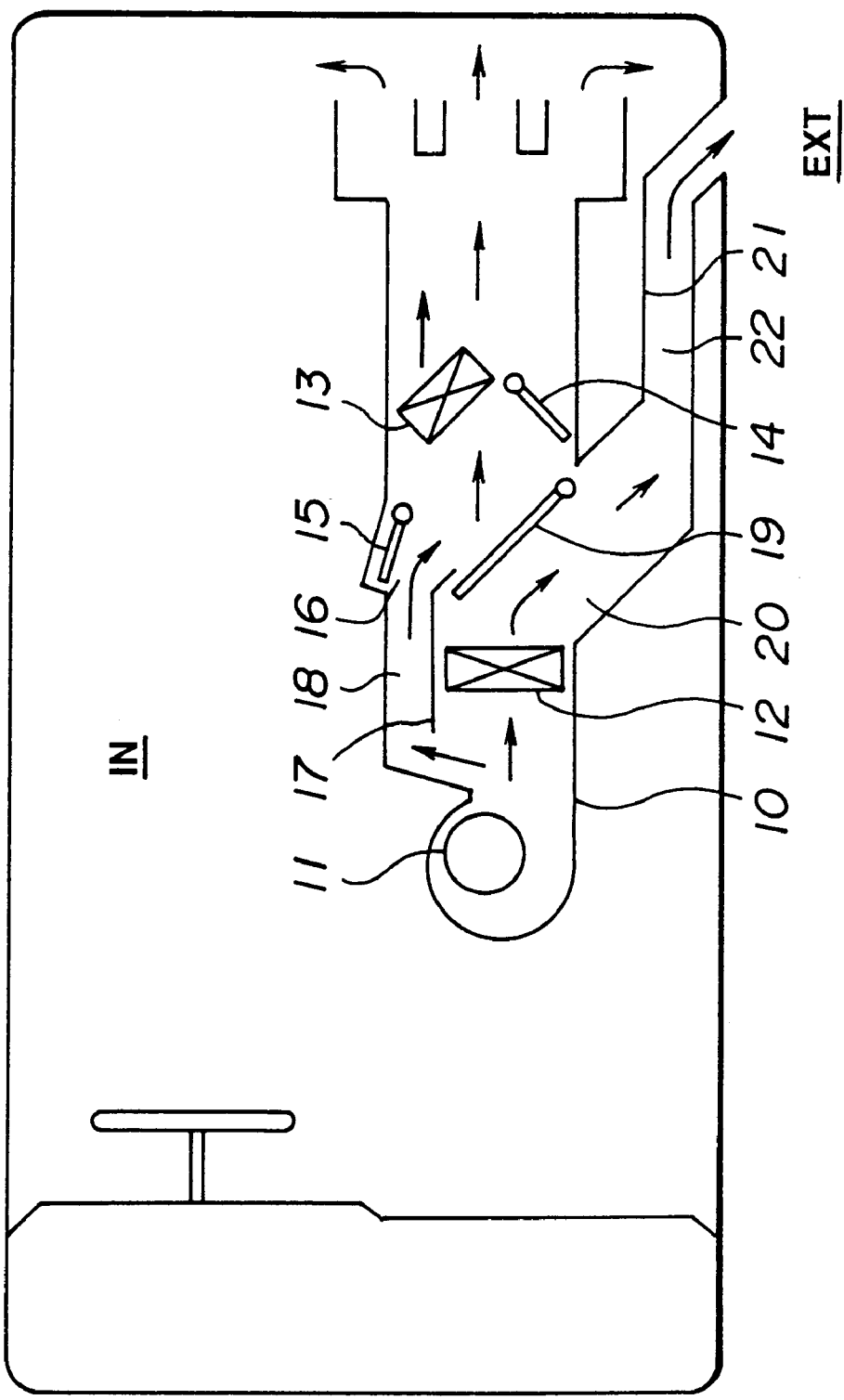
FIG. 1 is a schematic view of a vehicle including a vehicle air conditioning system according to a first embodiment of the present invention.
Figure 2:
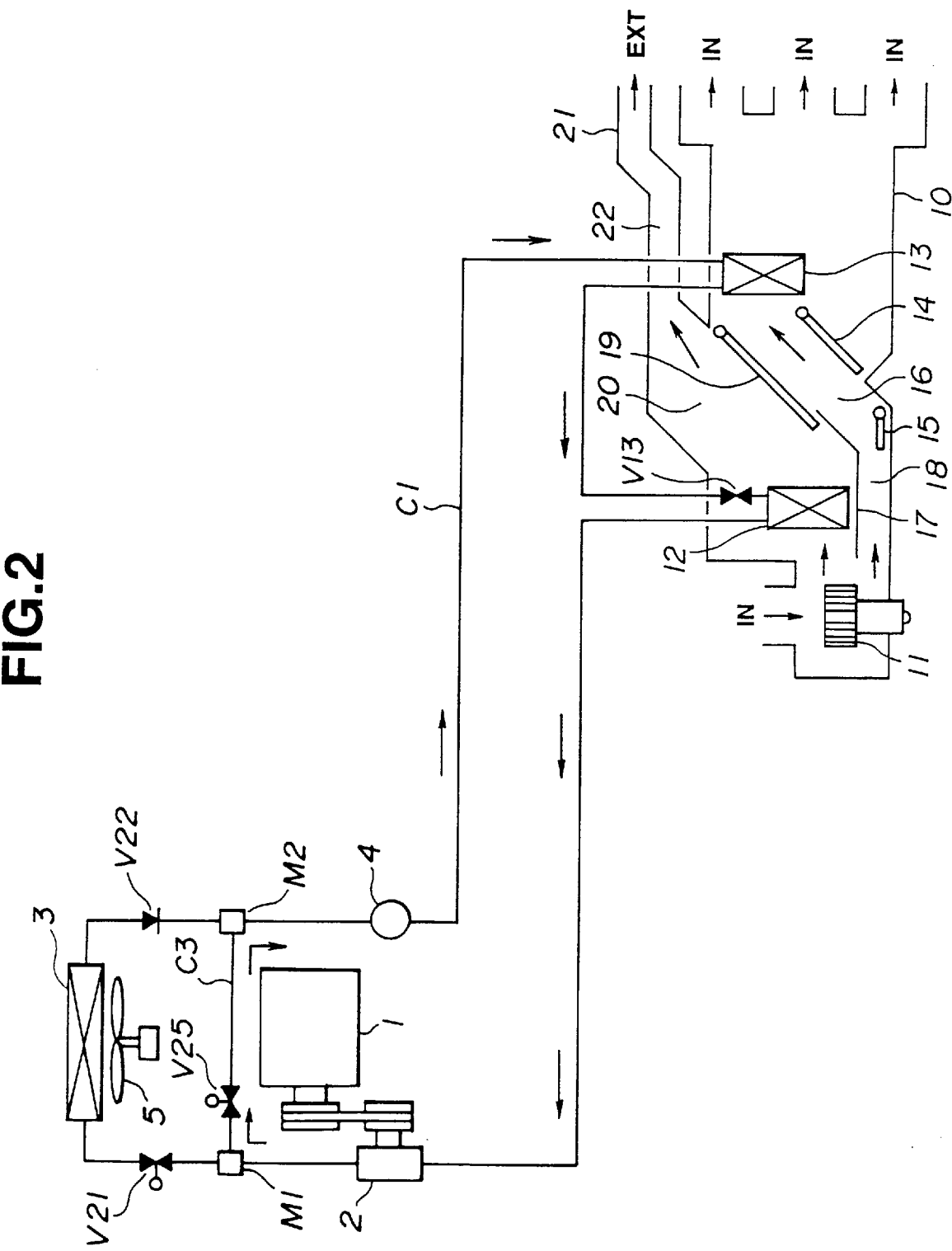
FIG. 2 is a schematic view showing the embodiment shown in FIG. 1.
Figure 3:
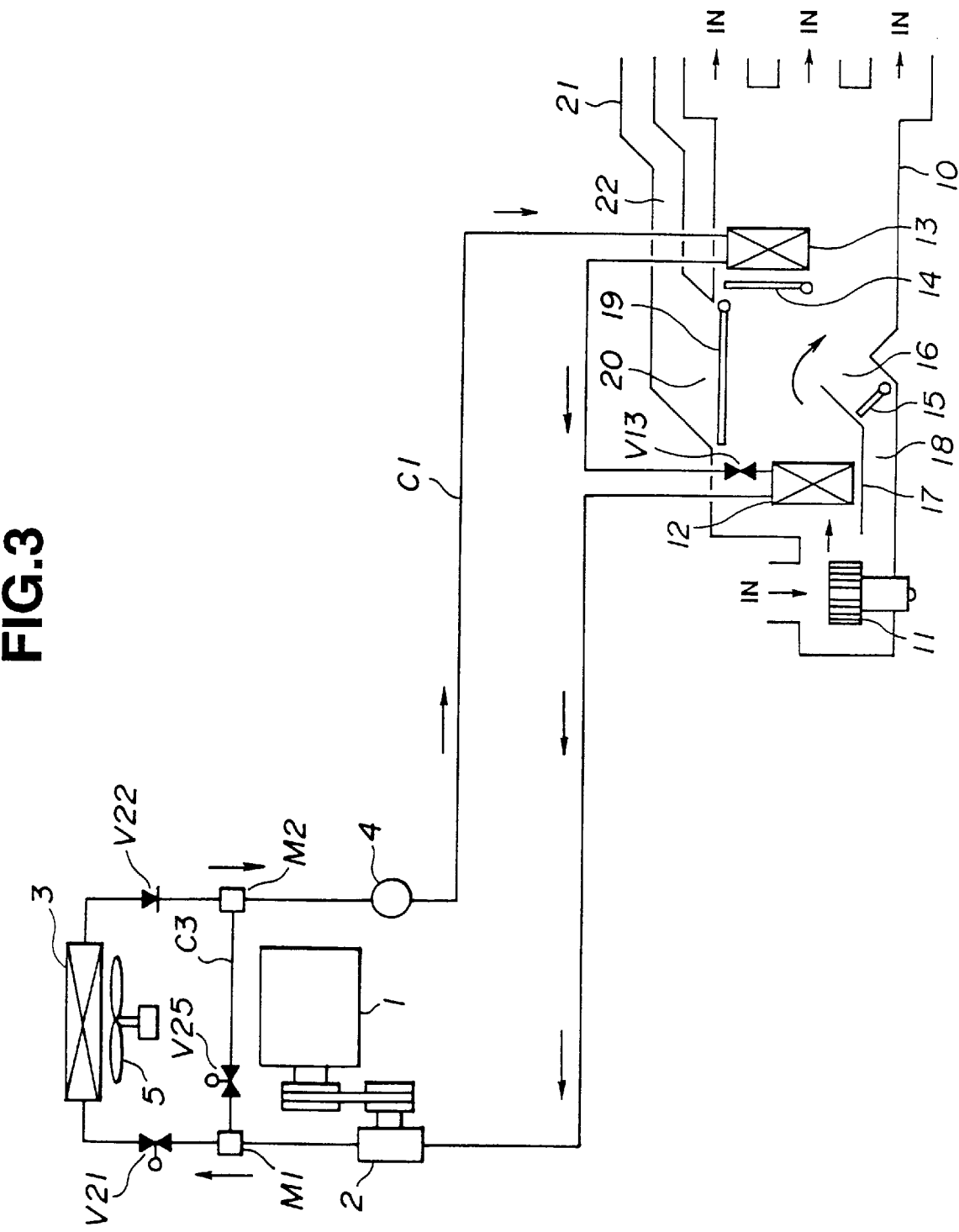
FIG. 3 is a schematic view showing a cooling operation in the first embodiment shown in FIG. 1.

FIGS. 1–3 show a first (or rear) air conditioning system according to a first embodiment of the present invention. As shown in FIGS. 1 and 2, the first air conditioning system comprises a rear (or first) air conditioning unit 10, a refrigerant circulation line C1 and a refrigerant bypass line C3.

The rear air conditioning unit 10 has a main air passage in which a blower (fan) 11, a first evaporator 12, an air mix door 14 and a second condenser 13 are disposed in order from the upstream side. The rear air conditioning unit 10 further comprises a bypass means and an exhaust means. The bypass means takes in inside air by bypassing the first evaporator 12. The exhaust means discharges inside air passed through the first evaporator 12 into the outside of the vehicle.

The bypass means comprises a bypass passage 18 and a bypass door 15. The bypass passage 18 is defined by a bypass partition wall 17. The bypass passage 18 extends from an upstream end opening toward the blower 11 and a downstream end 16 opening into the air passage section between the first evaporator 12 and the second condenser 13. The bypass passage 18 extends alongside the main air passage in which the first evaporator 12 is disposed. The partition wall 17 separates both air passages. The bypass door 15 regulates the quantity of inside air introduced through the bypass passage 18.

The exhaust means comprises an exhaust passage 22 and a switching door 19. The exhaust passage 22 is defined by an exhaust pipe 21 connected to an opening 20 facing the air passage section between the first evaporator 12 and the second condenser 13. The exhaust passage 22 extends along the air passage section in which the second condenser 13 is disposed. The switching door 19 regulates the quantity of inside air discharged from the opening 20 into the outside EXT of the vehicle.

The circulation line C1 comprises a line for circulating refrigerant. This line connects a compressor 2, a three-way connector M1, a solenoid valve V21, a first condenser 3, a check valve V22, a three-way connector M2, a liquid tank 4, the second condenser 13, an expansion valve V13 and the second evaporator 12 in series. The circulation line C1 circulates the refrigerant by introducing the refrigerant discharged from the compressor 2 into the first evaporator 12 through the first condenser 3. The first condenser 3 exchanges heat with outside air. The first evaporator 12 is connected with the second condenser 13 in series.

The bypass line C3 is a branch line of the circulation line C1. By the bypass line C3, the three-way connector M1, a solenoid valve V25 and the three-way connector M2 are connected in series. The bypass line C3 allows the refrigerant discharged from the compressor 2 to bypass the first condenser 3.

In a quick heating operation, the bypass door and exhaust door are controlled in the following manner.

The bypass door 15 and the exhaust door 19 are set at the open state as shown in FIG. 2. In this state, the bypass passage 18 takes in the inside air bypassing the first evaporator 12. The exhaust passage 22 discharges the inside air coming through the first evaporator 12 into the outside EXT. The solenoid valve V21 is set at the closed position to close the inlet side of the first condenser 3, and the solenoid valve V25 is set at the open position to open the bypass line C3. The refrigerant is circulating without passing through the first condenser 3.

The refrigerant in the form of a high pressure gas compressed by the compressor 2 detours the first condenser 3 and flows into the liquid tank 4 through the bypass line C3 extending from the three-way connector M1 to the three-way connector M2. Then, at the second condenser 13, the refrigerant condenses and exchanges heat (radiates heat) and warms the air passing therethrough. The refrigerant throttled by the expansion valve V13 evaporates and exchanges heat (absorbs heat) at the first evaporator 12 thereby cooling the air passing therethrough. Thereafter the refrigerant returns to the compressor 2 and further circulates. A fan shown by a reference numeral 5 in FIG. 2 promotes the heat exchange of the outside air with the refrigerant at the first condenser 3.

In the rear air conditioning unit 10, the inside air passing through the first evaporator 12 is cooled by exchanging heat with the refrigerant, and then flows through the exhaust passage 22 into the outside of the vehicle EXT without being warmed by the second condenser 13. The inside air passed through the bypass passage 18 is not cooled by the first evaporator 12, and flows through the second condenser 13, where the inside air is warmed by exchanging heat with the refrigerant. The air mix door 14 mixes the thus-warmed air with cold air not passing through the second condenser 13, and thereby adjusts the air temperature at a target value. The mixed air is blown from a ventilation opening and a foot opening for rear seats into the inside the vehicle IN by selectively driving doors not shown in the drawing.

The first air conditioning system can use the refrigerant discharged from the compressor as a heat source for warming of air conditioning, and recover heat from the inside air to be exhausted for ventilation with the first evaporator. Furthermore, the first air conditioning system warms the inside air to be circulated with the second condenser 13, and thereby raises the temperature of the inside air rapidly. Even when the temperature of outside air is low and the heat quantity of the engine cooling water is insufficient, this system enables a quick heating operation. Without the need for a hot water line, the first air conditioning system can simplify the arrangement of piping, and afford cost reduction by decreasing the number of required parts and man-hour for assemblage.

This air conditioning system can perform a dehumidifying heating operation by adjusting the opening degree of the exhaust door 19 and introducing a part of the inside air cooled by the first evaporator 12 into the air passage section having the second condenser 13 therein.

In a cooling operation, the bypass door 15 and the exhaust door 19 are controlled as shown in FIG. 3.

The bypass door 15 and the exhaust door 19 are set at the respective closed positions, and the air passage in the center of the drawing operates. The solenoid valve V25 is closed to close the bypass line C3, and the solenoid valve V21 opens the entrance to the first condenser 3. The refrigerant circulates through the first condenser 3. The air mix door 14 is set at the closed position and halts the function of the second condenser 13 by closing the air entrance to the second condenser 13.

The refrigerant compressed by the compressor 2 flows through the solenoid valve V21 into the first condenser 3, without flowing through the bypass line C3. The refrigerant in the form of a high pressure gas exchanges heat (radiates heat) with the outside air by condensing. The refrigerant passes through the check valve V22 into the liquid tank 4. Then, the refrigerant flows through the second condenser 13 without exchanging heat, and into the first evaporator 12 through the expansion valve V13. In the first evaporator 12, the refrigerant exchanges heat (absorbs heat) by evaporating in the first evaporator 12 and cools the air passing therethrough. The refrigerant is returned to the compressor 2 for further circulation.

In the rear air conditioning unit 10, the cold air adjusted to a target temperature by the first evaporator 12 is blown into the inside of the vehicle IN selectively through the ventilation opening and the foot opening without being warmed by the second condenser 13.

It is possible to control the air temperature more accurately by regulating the opening degree of the air mix door 14 and mixing the air warmed by the second condenser 13 with the air not warmed by the second condenser 13.

Figure 4:
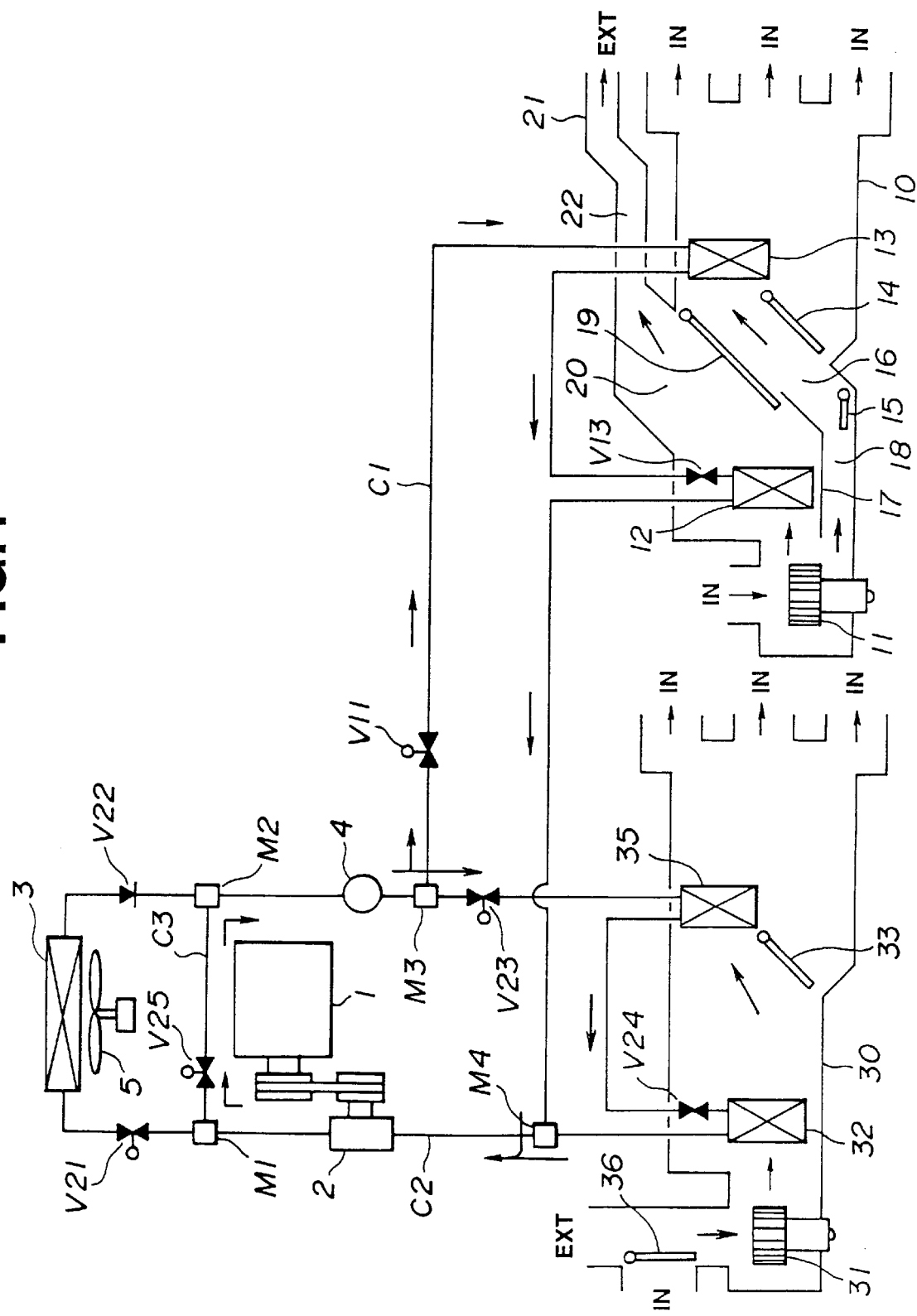
FIG. 4 is a schematic view showing a second embodiment.
Figure 5:
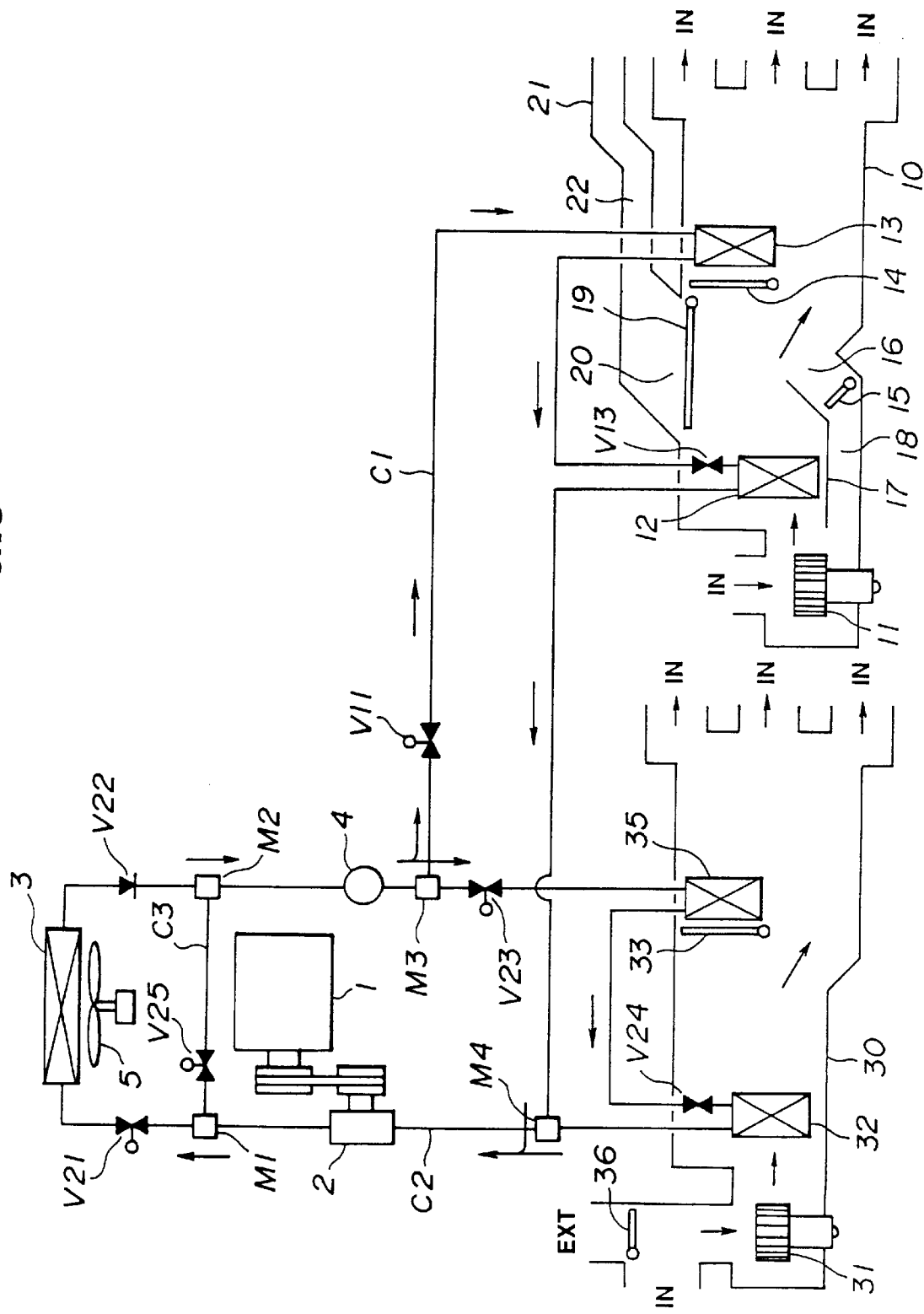
FIG. 5 is a schematic view showing a cooling operation in the second embodiment shown in FIG. 4

FIGS. 4 and 5 show a dual type vehicle air conditioner according to a second embodiment of the present invention. The dual type vehicle air conditioner comprises a first air conditioning system conditioning inside air and supplying conditioned air toward rear seats (a first compartment), and a second air conditioning system selectively conditioning inside and outside air and supplying conditioned air toward front seats (a second compartment).

The second air conditioning system of the second embodiment does not have a heater core 34 (a hot water line H) as shown in FIG. 4. The second air conditioning system of the second embodiment has a heat transfer device in the form of a third condenser 35. The first (rear) air conditioning system is substantially identical in construction to that of the first embodiment, so that the explanation is omitted.

The second air conditioning system comprises a front (or second) air conditioning unit 30, a refrigerant circulation line C2 and a refrigerant bypass line C3 as shown in FIGS. 4 and 5.

In the front air conditioning unit 30, an intake door 36, a blower (fan) 31, a second evaporator 32, an air mix door 33 and the third condenser (heat transfer device) 35 are disposed in order from the upstream side of an air passage.

The circulation line C2 comprises a line for circulating the refrigerant. In the line, a three-way connector M4, a compressor 2, a three-way connector M1, a solenoid valve V21, a first condenser 3, a check valve V22, a three-way connector M2, a liquid tank 4, a three-way connector M3, a solenoid valve V23, the third condenser 35, an expansion valve V24 and the second evaporator 32 are connected one after another. The circulation line C2 circulates the refrigerant by introducing the refrigerant discharged from the first compressor 2 through the first condenser 3 into the second evaporator 32. The second evaporator 32 is connected in series with the third condenser 35.

The bypass line C3 is a branch line of the refrigerant line C1. In the bypass line C3, the three-way connector M1, a solenoid valve 25 and the three-way connector M2 are connected in series. The bypass line C3 circulates the refrigerant discharged from the compressor 2 by bypassing the first condenser 3.

In this example, the first and second air conditioning systems have in common the main line connecting the three-way connector M4, the compressor 2, the three-way connector M1, the solenoid valve V21, the first connector 3, the check valve V22, the three-way connector M2, the liquid tank 4 and the three-way connector M3, and the bypass line C3 connecting the connector M1, the valve V25 and the connector M2. In this example, the compressor 2, the condenser 3, the liquid tank 4, the valves V21, V22, V25 and the bypass line C3 constitute a refrigerant circuit section common to the first and second conditioning systems.

In a quick heating operation, the refrigerant circulates through the front air conditioning unit 30 in the following manner.

The solenoid valve V21 is set at the close position and the solenoid valves V11, V23, V25 are set at the open position and the refrigerant circulates without passing through the first condenser 3 for exchanging heat with the outside air.

The refrigerant in the form of a high pressure gas compressed by the compressor 2 does not pass through the first condenser 3 but is introduced into the liquid tank 4 by passing through the bypass line C3 connecting the three-way connector M1 and the three-way connector M2. The refrigerant is branched by the three-way connector M3. A part of the refrigerant passes through the solenoid valve V11 into the second condenser 13 whereas the rest of the refrigerant passes through the solenoid valve V23.

Through the solenoid valve V23, the refrigerant flows into the third condenser 35 and warms the air by condensation in the third condenser 35. Then, after being throttled by the expansion valve 24, the refrigerant evaporates in the second evaporator 32 and cools the air passing therethrough by heat exchange (heat absorption) and cools air passing through. The refrigerant from the second evaporator 32 joins the refrigerant from the second evaporator 12 at the three-way connector M4, and the confluence returns to the compressor 2.

In the front air conditioning unit 30, the air is dehumidified by being cooled by the second evaporator 32, and then warmed by the third condenser 35. The air mix door 33 mixes the warmed air with the cool air not passing through the third condenser 35 to regulate the air temperature. Then, the mixed air of the controlled temperature is blown into the inside of the vehicle IN from a defroster opening, a ventilation opening and a foot opening for the front seats by selectively driving doors for the openings.

Because the second air conditioning system can use the refrigerant discharged from the compressor as a heat source for warming of air conditioning, the second air conditioning system does not need a hot water line. A stable quick heating operation is possible when the temperature of outside air is low and the heat quantity of engine cooling water is insufficient. Because the second air conditioning system does not need the hot water line, the second air conditioning system can simplify a pipe arrangement and can improve productivity.

The flow of the refrigerant in a cooling operation in relation to the front air conditioning unit 30 is explained with reference to FIG. 5.

The solenoid valve V25 is set at the closed position and the solenoid valves V11, 21, 23 are set at the open position, so that the refrigerant circulates through the condenser 3. The air mix doors 14 and 33 are set at the closed position and halt the functions of the condensers 14 and 35, respectively.

The refrigerant compressed by the compressor 2 passes through the solenoid valve V21 into the first condenser 3. The refrigerant in the form of a high pressure gas exchanges heat (radiates heat) with the outside air by condensing. The refrigerant further flows through the check valve V22 into the liquid tank 4. The refrigerant flow is divided by the three-way connector M3. A part of the refrigerant flows through the solenoid valve V11 into the second condenser 13 while the rest of the refrigerant flows through the solenoid valve V23 opening the entrance to the circuit section of the third condenser 35 and the second evaporator 32.

From the solenoid valve V23, the refrigerant passes through the third condenser 35 without exchanging heat. Then, the refrigerant flows through the expansion valve V24 into the second evaporator 32, in which the refrigerant evaporates by exchanging heat (absorbing heat) and cools the air passing therethrough. The refrigerant flows into the three-way connector M4 and joins the refrigerant from the first evaporator 12. From the connector M4, the refrigerant is returned to the compressor 2.

In the front air conditioning unit 30, the air cooled by the second evaporator 32 is blown into the compartment IN, without being warmed by the third condenser 35, selectively through the defroster opening, ventilation opening and foot opening.

The air conditioning unit 30 can control the opening degree of the air mix door 33, and mix the warm air passing through the third condenser 35 and the cool air detouring the third condenser 35 at a controlled mixture ratio to control the temperature of conditioned air.

Figure 6:
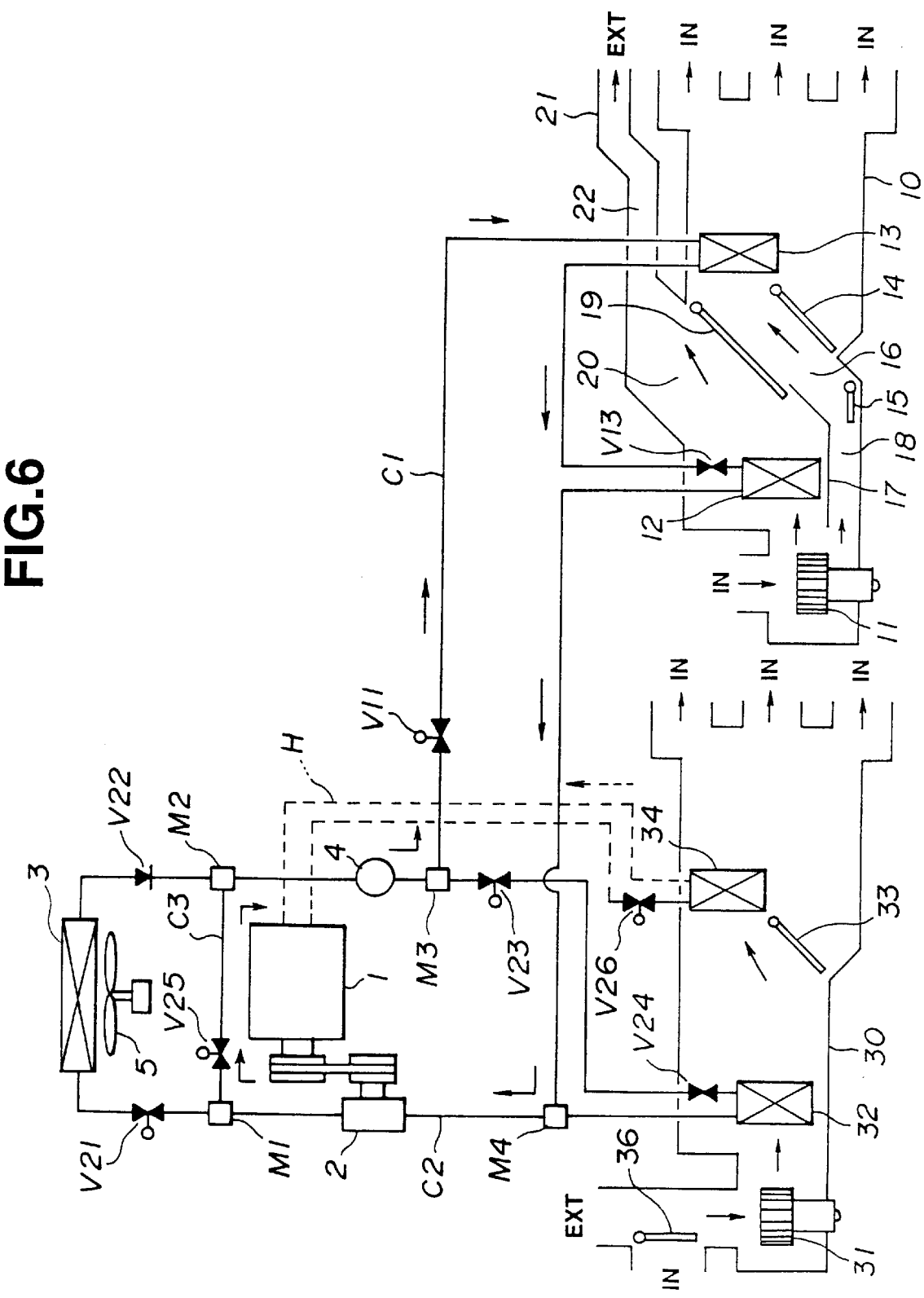
FIG. 6 is a schematic view showing a third embodiment.
Figure 7:
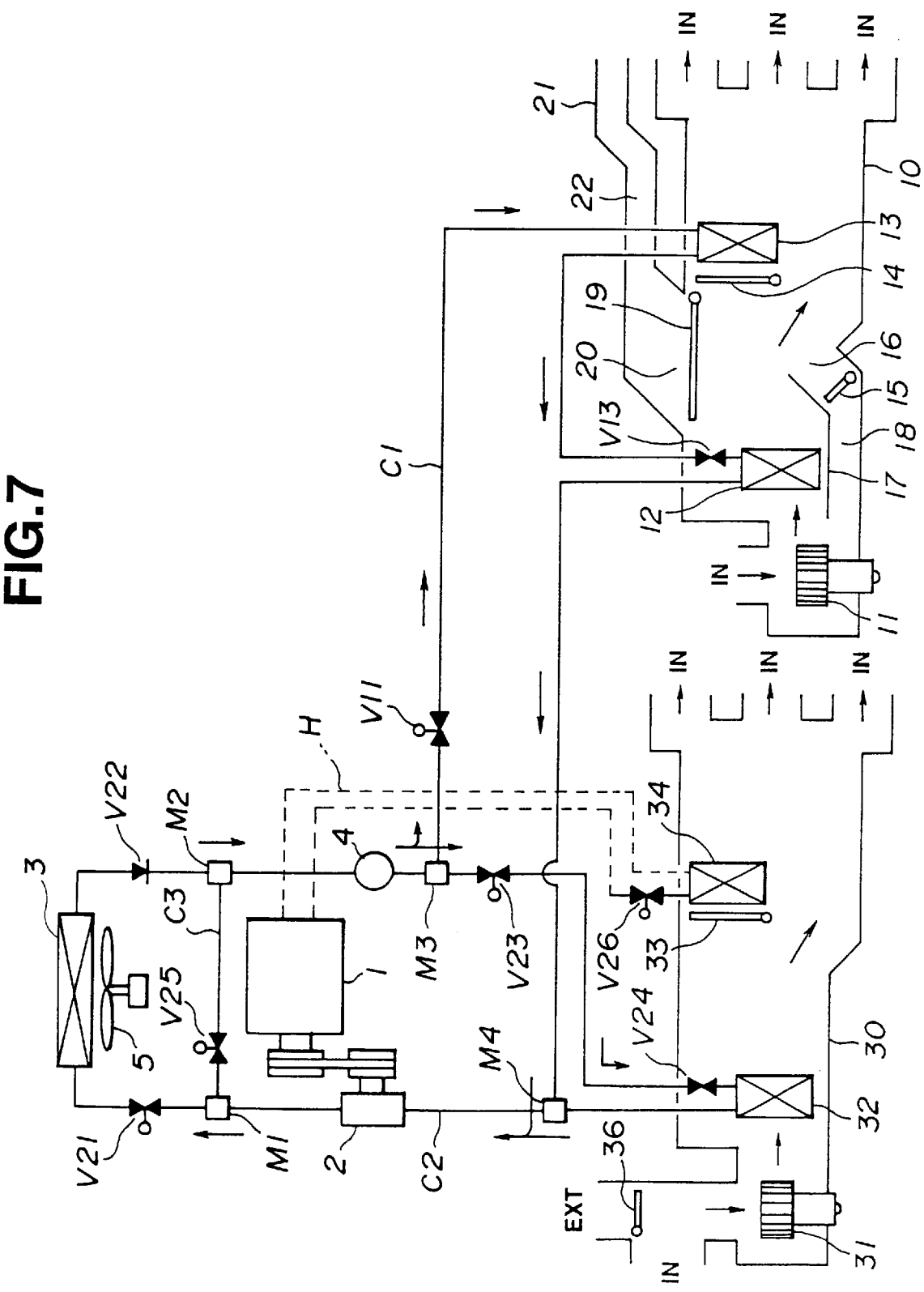
FIG. 7 is a schematic view showing a cooling operation in the third embodiment shown in FIG. 6.

FIGS. 6 and 7 show a third embodiment of the present invention.

In the third embodiment, the second air conditioning system comprises a heat transfer device in the form of a heater core 34 (a hot water line H). The first air conditioning system is substantially identical to those of the preceding embodiments.

The second air conditioning system comprises a front (or second) air conditioning unit 30, a refrigerant circulation line C2, a refrigerant bypass line C3 and a hot water line H as shown in FIG. 6.

In the front air conditioning unit 30, an intake door 36, a blower 31, a second evaporator 32, an air mix door 33 and the heater core 34 are disposed in order from the upstream side in an air passage.

The circulation line C2 comprises a line circulating the refrigerant. In the line, a three-way connector M4, a compressor 2, a three-way connector M1, a solenoid valve V21, a first condenser 3, a check valve V22, a three-way connector M2, a liquid tank 4, a three-way connector M3, a solenoid valve V23, an expansion valve V24 and a second evaporator 32 are connected in series. The circulation line C2 introduces the refrigerant discharged from the first compressor 2 into the second evaporator 32 through the first condenser 3.

The bypass line C3 is a branch line of the refrigerant line. In the bypass line, the three-way connector M1, a solenoid valve V25 and the three-way connector M2 are connected in series. The bypass line C3 circulates the refrigerant discharged from the compressor 2 by bypassing the first condenser 3.

In the hot water line H, an engine 1, a water valve V26 and the heater core 34 are connected in series. The hot water line circulates the engine cooling water.

The refrigerant and hot water (engine cooling water) flow through the front air conditioning unit 30 in a quick heating operation in the following manner.

The solenoid valves V21 and V23 are set at the close position and the solenoid valves V11 and V25 are set at the open position, and the refrigerant circulates bypassing the first condenser 3. The solenoid valve V23 closes the line to the second evaporator 32, and prevents the refrigerant compressed by the compressor 2 from being introduced into the second evaporator 32 of the front air conditioning unit 30. The second evaporator 32 is inoperative. The water valve V26 is set at the open position, and admits the hot engine cooling water to the heater core 34. In the heater core 34, the hot water exchanges heat with the air passing therethrough and returns to the engine 1 for further circulation.

In the front air conditioning unit 30, the heater core 34 warms the air passing through the second evaporator 32 without exchanging heat, and the air mix door 33 mixes the thus-warmed air with the cool air detouring the heater core 34. The mixed air of the regulated temperature is blown selectively through a defroster opening, a ventilation opening and a foot opening for front seats into the inside of the vehicle IN.

By using the engine cooling water as a heat source for air conditioning, the second air conditioning system can reduce the load of the refrigerant line in a heating operation and improve energy efficiency.

FIG. 7 shows the air conditioner in a cooling mode.

The solenoid valve V25 is set at the closed position and the solenoid valves V11, V21 and V23 are set at the open position so that the refrigerant circulates through the condenser 3. The water valve V26 is set at the closed position and the hot water line H is out of operation. The air mix doors 14 and 33 are set at the closed position and turn off the function of the second condenser 13 and the heater core 34, respectively.

The refrigerant compressed by the compressor 2 flows through the solenoid valve V21 into the first condenser 3, in which the refrigerant condenses and exchanges heat (radiates heat) with the outside air. The refrigerant further flows through the check valve V22 into the liquid tank 4. The refrigerant is divided by the three-way connector M3. A part of the refrigerant passes through the solenoid valve V11 into the second condenser 13, and the rest of the refrigerant passes through the solenoid valve V23.

From the solenoid valve V23, the refrigerant flows through the expansion valve V24 into the second evaporator 32 and cools the air by evaporating in the second evaporator 32. The refrigerant from the second evaporator 32 and the refrigerant from the first evaporator 12 join together at the three-way connector M4 and return to the compressor 2.

In the front air conditioning unit 30, the air cooled by the second evaporator 32 is blown into the compartment IN, without being warmed by the heater core 34, selectively through the defroster opening, ventilation opening and foot opening.

The air conditioning unit 30 can control the opening degree of the air mix door 33 and the opening degree of the water valve V26, and mix the warm air passing through the heater core 34 and the cool air detouring the heater core 34 at a controlled mixture ratio to control the temperature of conditioned air.

Figure 8:
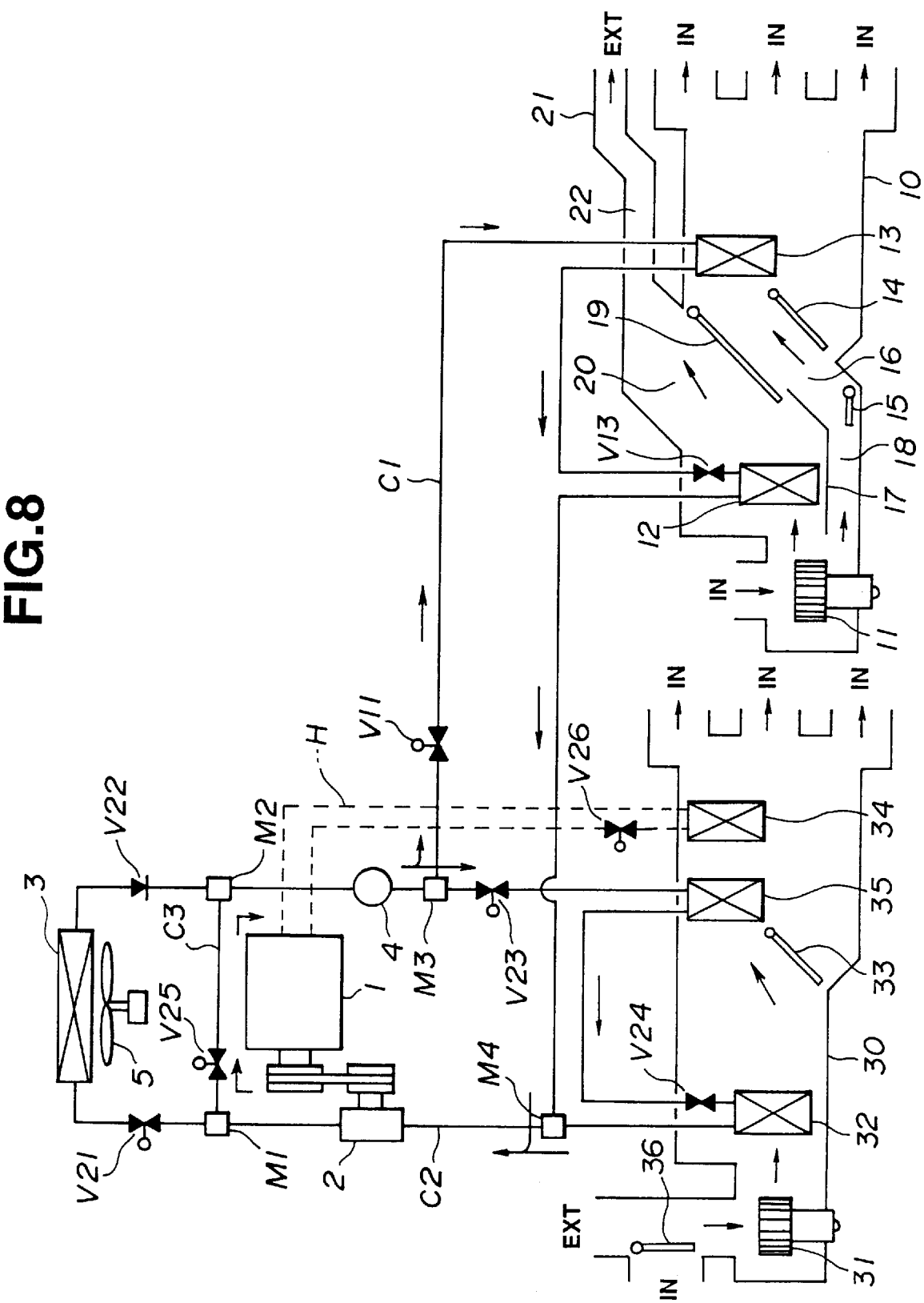
FIG. 8 is a schematic view showing a fourth embodiment.
Figure 9:
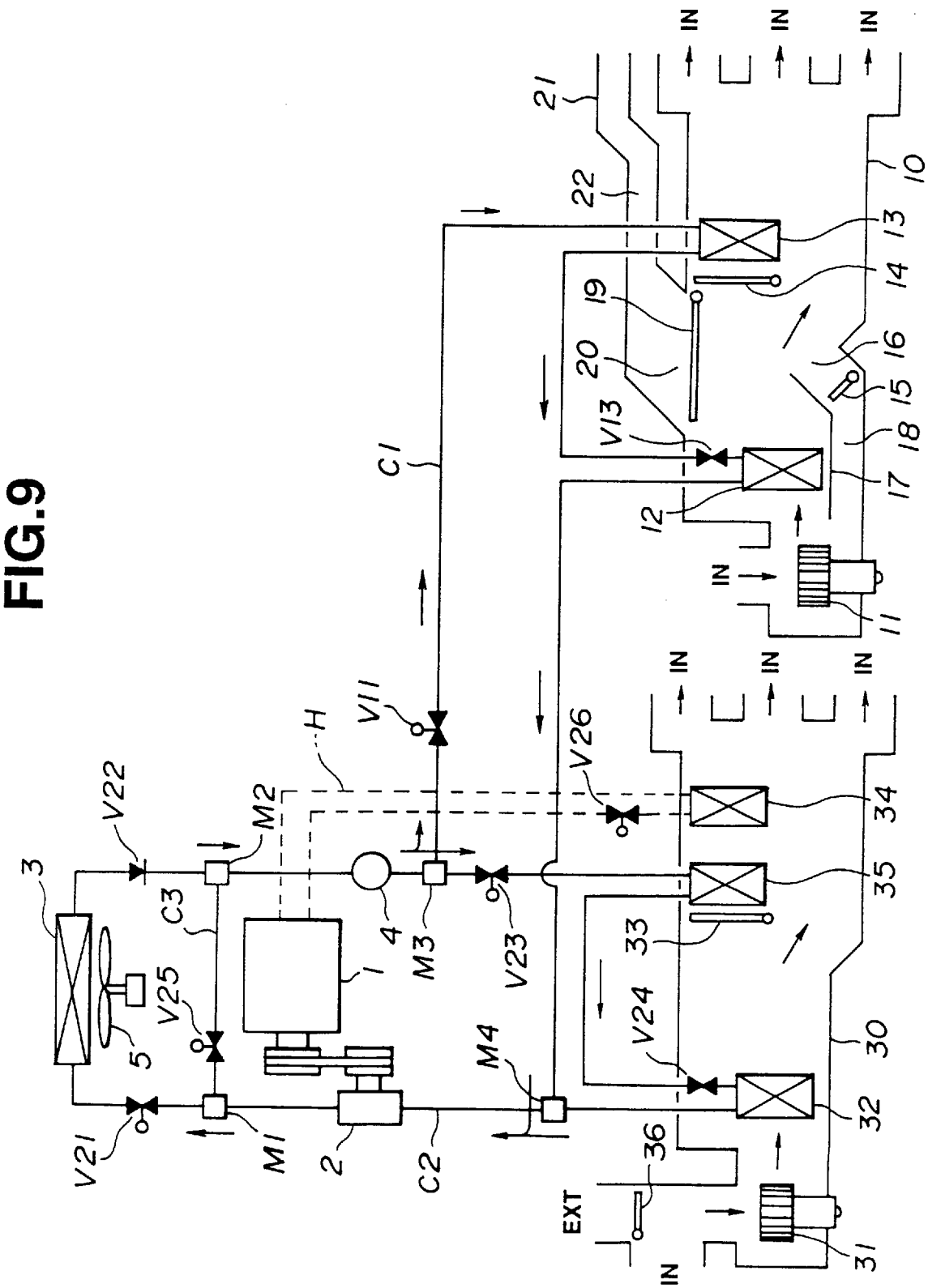
FIG. 9 is a schematic view showing a cooling operation in the fourth embodiment shown in FIG. 8.

FIGS. 8 and 9 show a fourth embodiment of the present invention.

In the fourth embodiment, the second air conditioning system comprises a heat transfer device which comprises both of a heater core 34 (a hot water line H) and a third condenser 35 as shown in FIG. 8. The first air conditioning system is substantially identical to those of the preceding embodiments.

The second air conditioning system comprises a front (a second) air conditioning unit 30, a refrigerant circulation line C2, a refrigerant bypass line C3 and a hot water line H as shown in FIG. 8.

In the front air conditioning unit 30, an intake door 36, a blower 31, a second evaporator 32, an air mix door 33, the third condenser 35 and the heater core 34 are disposed in order from the upstream side of an air passage.

The circulation line C2 comprises a line circulating the refrigerant. In the circulation line C2, a three-way connector M4, a compressor 2, a three-way connector M1, a solenoid valve V21, a first condenser 3, a check valve V22, a three-way connector M2, a liquid tank 4, a three-way connector M3, a solenoid valve V23, the third condenser 35, an expansion valve V24 and a second evaporator 32 are connected in series. The bypass line C3 is a branch line of a refrigerant line C1. In the bypass line C3, the three-way connector M1, a solenoid valve V25 and the three-way connector M2 are connected in series. The refrigerant line comprising the circulation line C2 and the bypass line C3 is the same as that of the embodiment shown in FIGS. 5 and 6.

The hot water line H circulates engine cooling water. In the hot water line H, an engine 1, a water valve V26 and the heater core 34 are connected in series. The hot water line H is the same as that of the embodiment in FIG. 6 and FIG. 7.

The flow of refrigerant and hot water (engine cooling water) in a quick heating operation is as follows.

The solenoid valve V21 is set at the closed position and the solenoid valves V11, V23 and V25 are set at the open position. The refrigerant circulates bypassing the first condenser 3. The water valve V26 is set at the open position.

The refrigerant compressed by the compressor 2 flows through the bypass line C3 bypassing the first condenser 3 and into the liquid tank 4. The refrigerant is branched by the three-way connector M3. A part of the refrigerant passes through the solenoid valve V11 into the second condenser 13, and the rest of the refrigerant passes through the solenoid valve V23.

In the circuit section downstream of the solenoid valve V23, the refrigerant warms the air by condensation in the third condenser 35. The refrigerant is then throttled by the expansion valve 24, and cools the air by evaporation in the second evaporator 24. The refrigerant joins the refrigerant from the first evaporator 12 at the three-way connector M4 and returns to the compressor 2.

The hot water (the engine cooling water) supplied from the engine 1 is supplied to the heater core 34 and exchanges heat with the air passed through the third condenser 35. The hot water then returns to the engine 1. In the example of FIG. 8, the heater core 34 is disposed downstream of the third condenser 35 in the air passage.

In the front air conditioning unit 30, the warm air is mixed with the cold air. The warm air is the air warmed by the third condenser 35 and the heater core 34 after being cooled and dried by the second evaporator 32. The cold air is the air detouring the third condenser 35 and the heater core 34 by the action of the air mix door 33. The mixed air of the regulated temperature is blown into the inside of the vehicle IN from the defroster opening, ventilation opening and foot opening for the front seats by selectively driving the doors for the openings.

The thus-constructed second air conditioning system can use both of the engine cooling water and the refrigerant discharged from the compressor as a heat resource for air conditioning. The second air conditioning system can improve the ability of heating the air quickly.

FIG. 9 shows a cooling operation of the front air conditioning unit 30.

The solenoid valve 25 is set at the closed position and the solenoid valves V11, V21 and V23 are set at the open position, so that the refrigerant circulates through the first condenser 3. The water valve V26 is set at the closed position and the hot water line H is out of operation. The air mix doors 14 and 33 are set at the closed position and turn off the function of the second condenser 13, the third condenser 35 and the heater core 34.

The refrigerant compressed at the compressor 2 passes through the solenoid valve V21 into the first condenser 3 and exchanges heat (radiates heat) with the outside air by condensing. The refrigerant passes through the check valve V22 into the liquid tank 4. The refrigerant is branched by the three-way connector M3. A part of the refrigerant passes through the solenoid valve V11 into the second condenser 13, and the rest of the refrigerant passes through the solenoid valve V23.

The refrigerant from the solenoid valve V23 passes through the third condenser 35 without exchanging heat, is throttled by the expansion valve V24, evaporates in the second evaporator 32, exchanges heat (absorbs heat), and cools the air passing therethrough. The refrigerant flows into the three-way connector M4, joins the refrigerant from the first evaporator 12, and returns to the compressor 2.

In the front air conditioning unit 30, the cold air cooled by the second evaporator 32 to a target temperature is blown into the inside IN, without being warmed by the third condenser 35 and the heater core 34, through a selected one or more of the defroster opening, ventilation opening and foot opening.

The front air conditioning unit 30 can control the opening degrees of the air mix door 33 and the water valve V26 and mix the air warmed by the third condenser 35 and the heater core 34 with the cold air detouring the third condenser 35 and the heater core 34 by the aid of the air mix door 35, to control the temperature of the conditioned air adequately.

The present invention has the following merits:

The first air conditioning system for taking in inside air and supplying conditioned air to the first compartment can use refrigerant discharged from the compressor as a heat source for air conditioning and can recover heat from the inside air discharged for ventilation by exchanging heat at the first evaporator. Even when the temperature of outside air is low and the heat quantity of engine cooling water is insufficient, a quick heating operation is possible. Because the first air conditioning system does not need a hot water line, the first air conditioning system can simplify a pipe arrangement and can improve productivity.

The second air conditioning system according to the second embodiment for selectively taking in inside and outside air and supplying conditioned air to a second compartment can use the refrigerant discharged from the compressor as a heat source for air conditioning without the need for a hot water line. Even when the temperature of outside air is low and a heat source of engine cooling water is insufficient, a stable quick heating operation is possible. Eliminating the need of a hot water line, the second air conditioning system can simplify a pipe arrangement and can improve productivity.

The second air conditioning system according to the third embodiment for selectively taking in inside and outside air and supplying conditioned air to a second compartment can use engine cooling water as a heat source for air conditioning. The second air conditioning system can reduce the load of a refrigerant line in a heating operation and can improve energy efficiency.

The second air conditioning system of the fourth embodiment for selectively taking in inside and outside air and supplying conditioned air to a second compartment can use engine cooling water and refrigerant discharged from a compressor as a heat source for warming of air conditioning. The second air conditioning system can further improve the quick heating ability.

In one example, each of the doors 14, 15, 19, 33 etc, is operated by an actuator. A control unit is electrically connected with the actuators for the doors and the solenoid valves, and configured to control the doors and valves by sending electric control signals. The control unit has, as a main component, an onboard CPU, for example.

What is claimed is:

1. A vehicle air conditioner comprising a first air conditioning system for taking in inside air, conditioning the inside air and supplying conditioned air to a first compartment of a vehicle and a second air conditioning system for selectively taking in the inside air and outside air, conditioning intake air and supplying conditioned air to a second compartment of the vehicle, wherein said first air conditioning system comprises:

a refrigerant line comprising a circulation line introducing refrigerant discharged from a compressor, through a first condenser into a first evaporator connected in series with a second condenser, and a bypass line bypassing said first condenser; and a first air conditioning unit comprising a first air passage in which said first evaporator is disposed at an upstream position and said second condenser is disposed at a downstream position downstream of said upstream position, bypass means for introducing the inside air into said second condenser through a bypass passage bypassing said first evaporator, and exhaust means for discharging the inside air coming through said first evaporator into an outside of the vehicle.

2. A vehicle air conditioner comprising a first air conditioning system for taking in inside air, conditioning the inside air and supplying conditioned air to a first compartment of a vehicle and a second air conditioning system for selectively taking in the inside air and outside air, conditioning intake air and supplying conditioned air to a second compartment of the vehicle, wherein said first air conditioning system comprises:

a refrigerant line comprising a circulation line introducing refrigerant discharged from a compressor, through a first condenser into a first evaporator connected in series with a second condenser, and a bypass line bypassing said first condenser; and a first air conditioning unit comprising a first air passage in which said first evaporator is disposed at an upstream position and said second condenser is disposed at a downstream position downstream of said upstream position, bypass means for introducing the inside air into an air passage section between said first evaporator and said second condenser, and exhaust means for discharging the inside air coming through said first evaporator into an outside of the vehicle, the refrigerant line comprising a circulation line introducing the refrigerant discharged from said compressor into a third condenser and a second evaporator through said first condenser and the bypass line bypassing said first condenser; and a second air conditioning unit comprising a second air passage in which said second evaporator is disposed at an upstream position and said third condenser is disposed at a downstream position downstream of said upstream position.

3. A vehicle air conditioner comprising a first air conditioning system for taking in inside air, conditioning the inside air and supplying conditioned air to a first compartment of a vehicle and a second air conditioning system for selectively taking in the inside air and outside air, conditioning intake air and supplying conditioned air to a second compartment of the vehicle, wherein said first air conditioning system comprises:

a refrigerant line comprising a circulation line introducing refrigerant discharged from a compressor, through a first condenser into a first evaporator connected in series with a second condenser, and a bypass line bypassing said first condenser; and a first air conditioning unit comprising a first air passage in which said first evaporator is disposed at an upstream position and said second condenser is disposed at a downstream position downstream of said upstream position, bypass means for introducing the inside air into an air passage section between said first evaporator and said second condenser, and exhaust means for discharging the inside air coming through said first evaporator into an outside of the vehicle, the refrigerant line comprising a circulation line introducing the refrigerant discharged from said compressor into a second evaporator through said first condenser and the bypass line bypassing said first condenser, a hot water line introducing engine cooling water into a heater core; and a second air conditioning unit comprising a second air passage in which said second evaporator is disposed at an upstream position and said heater core is disposed at a downstream position downstream of said upstream position.

4. A vehicle air conditioner as claimed in claim 3 wherein said second air conditioning unit further comprises a third condenser, said third condenser is disposed in said second air passage at a position between said second evaporator and said heater core, said third condenser is connected in series with said second evaporator by said refrigerant line; and a refrigerant outlet of said third condenser is connected with a refrigerant inlet of said second evaporator.

5. A vehicle air conditioning system comprises:

a refrigerant circuit for circulating refrigerant, said refrigerant circuit comprising a first circuit section comprising a compressor, a first condenser exchanging heat with outside air and a bypass line bypassing said first condenser, and a second circuit section comprising a second condenser and a first evaporator; and a first air conditioning unit comprising a first air passage for passing inside air through the first evaporator disposed in the first air passage and the second condenser located downstream of the first evaporator in said first air passage, a bypass air passage for allowing the inside air to flow into the second condenser bypassing said first evaporator, and an exhaust air passage for discharging the inside air passed through said first evaporator into an outside of the vehicle.

6. An air conditioning system as claimed in claim 5 wherein said compressor of said refrigerant circuit by an engine of the vehicle.

7. A vehicle air conditioning system comprises:

a refrigerant circuit for circulating refrigerant, said refrigerant circuit comprising a first circuit section comprising a compressor, a first condenser exchanging heat with outside air and a bypass line bypassing said first condenser, and a second circuit section comprising a second condenser and a first evaporator;

a first air conditioning unit comprising a first air passage for passing inside air through the first evaporator disposed in the first air passage and the second condenser located downstream of the first evaporator in said first air passage, a bypass air passage for allowing the inside air to flow into the second condenser bypassing said first evaporator, and an exhaust air passage for discharging the inside air passed through said first evaporator into an outside of the vehicle; and a second air conditioning unit comprising a second air passage; said refrigerant circuit further comprises a third circuit section comprising a second evaporator disposed in said second air passage of said second air conditioning unit; and said air conditioning system further comprises a heat transfer device disposed in said second air passage of said second air conditioning unit at a position downstream of said second evaporator.

8. An air conditioning system as claimed in claim 7 wherein said first air passage of said first air conditioning unit extends from an upstream end for taking in the inside air to a downstream end leading into an inside of the vehicle, said first conditioning unit further comprises a bypass door for regulating an air flow through the bypass passage and a switching door for opening and closing the exhaust passage.

9. An air conditioning system as claimed in claim 8 wherein said first air conditioning unit further comprises a blower for forcing the inside air into said first evaporator and said bypass passage, and an air mix door for opening and closing an entrance to said second condenser.

10. An air conditioning system as claimed in claim 9 wherein said second air conditioning unit comprises an inside air inlet for taking in the inside air, an outside air inlet for taking in the outside air and an intake door for selectively introducing the inside air from the inside air inlet and the outside air from the outside air inlet into the second air passage, and said second air conditioning unit comprises a blower for producing an air flow in said second air passage and an air mix door comprising a first position for allowing air to pass through the heat transfer device and a second position for causing air to bypass the heat transfer device.

11. An air conditioning system as claimed in claim 9 wherein said air conditioning system further comprises a first branch three way connector having a single inlet port for receiving the refrigerant from said first circuit section, a first outlet port for introducing the refrigerant into said second circuit section, and a second outlet port for introducing the refrigerant into said third circuit section, and a second branch three way connector having a first inlet port for receiving the refrigerant from said second circuit section, a second inlet port for receiving the refrigerant from said third circuit section, and a single outlet port for returning the refrigerant to said first circuit section.

12. An air conditioning system as claimed in claim 11 wherein said first circuit section comprises a first solenoid valve for allowing and preventing a refrigerant flow to the first condenser, and a second solenoid valve for opening and closing the bypass line, said second circuit section comprises a solenoid valve disposed in a refrigerant line segment connecting the first outlet port of the first branch three way connector and a refrigerant inlet of said second condenser, and an expansion valve disposed in a refrigerant line segment connecting a refrigerant outlet of said second condenser and a refrigerant inlet of said first evaporator, and said third circuit section comprises a solenoid valve for preventing and allowing a refrigerant flow from the second outlet port of the first branch three way connector into said third circuit section, and an expansion valve disposed in a refrigerant line segment for introducing the refrigerant into said second evaporator.

13. An air conditioning system as claimed in claim 12 wherein said heat transfer device is a third condenser connected between said second outlet port of said first branch three way connector and said second evaporator in said third circuit section.

14. An air conditioning system as claimed in claim 12 wherein said heat transfer device is a heater core disposed in a hot water line introducing engine cooling water into said heater core.

15. An air conditioning system as claimed in claim 12 wherein said heat transfer device comprises a third condenser and a heater core, said third condenser is connected between said second outlet port of said first branch three way connector and said second evaporator in said third circuit section, and said heater core is disposed in a hot water line introducing engine cooling water into said heater core.

16. An air conditioning system as claimed in claim 12 wherein said first air conditioning unit comprises a first air conditioning state in which said bypass door is in an open position for introducing the inside air through the bypass passage to the second condenser, said switching door is in an open position for preventing the inside air passed through said first evaporator from flowing to said second condenser and instead leading the inside air passed through said first evaporator into the exhaust passage, and said air mix door is in a first position for directing the inside air from the bypass passage to the second condenser; and a second air conditioning state in which said bypass door is in a closed position for closing the bypass passage, said switching door is in a closed position for closing said exhaust passage, and said air mix door is in a second position for preventing the inside air passed through said first evaporator from flowing into said second condenser and instead allowing the inside air passed through said first evaporator to reach said downstream end of said first air passage bypassing said second condenser.

17. An air conditioning system as claimed in claim 16 wherein said air conditioning system comprises a quick heating state in which said first air conditioning unit is in said first air conditioning state, said first solenoid valve of said first circuit section is in a closed position for closing a refrigerant line for introducing the refrigerant to the first condenser, said second solenoid valve is in an open position for opening said bypass line, and a cooling state in which said first air conditioning unit is in said second air conditioning state, said first solenoid valve of said first circuit section is in an open position for opening the refrigerant line for introducing the refrigerant to the first condenser, and said second solenoid valve of said first circuit section is in a closed position for closing said bypass line.

\* \* \* \* \*